Patented June 14, 1932

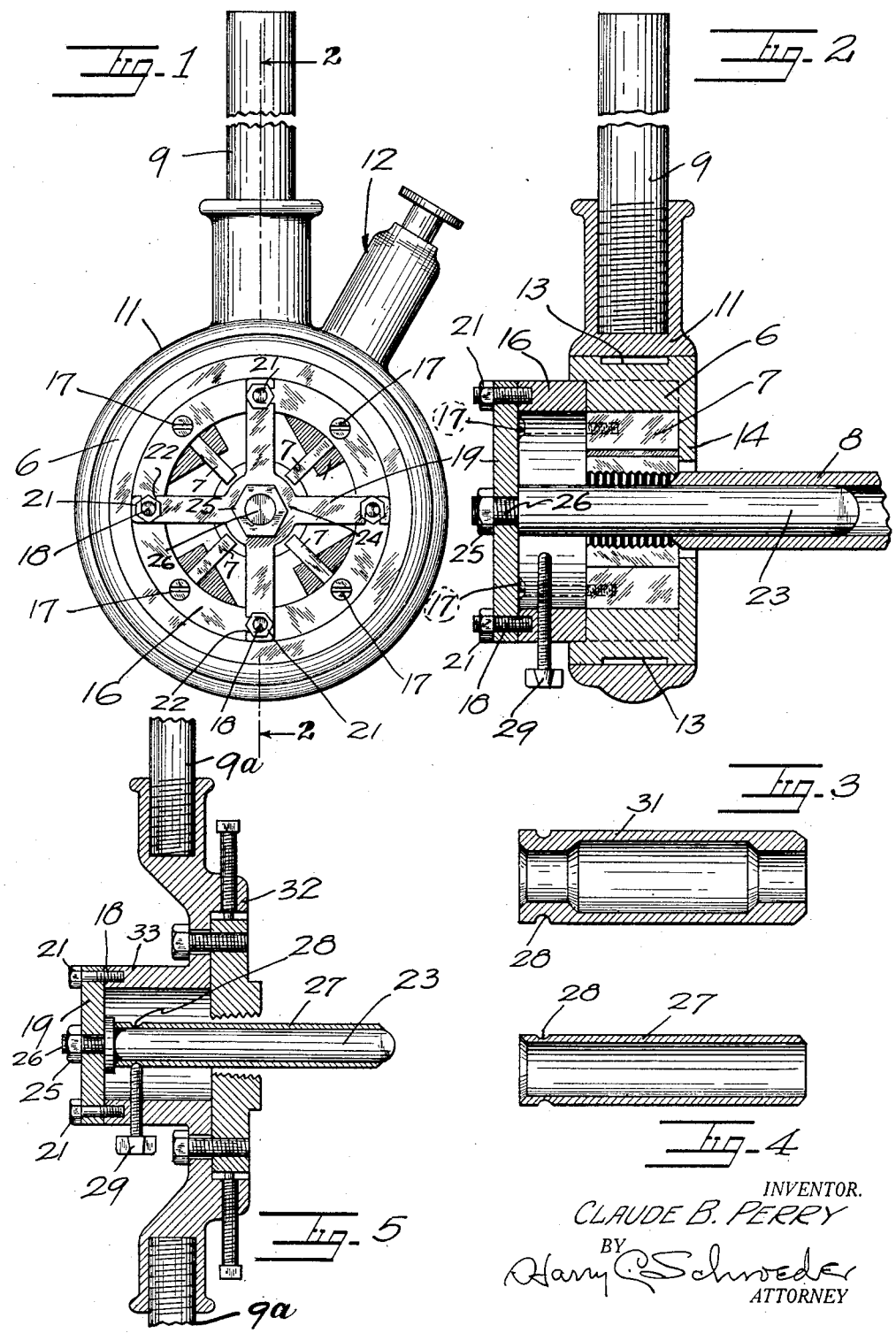

1,863,067

UNITED STATES PATENT OFFICE

CLAUDE B. PERRY, OF SAN JOSE, CALIFORNIA

PIPE THREADING DEVICE

Application filed April 4, 1928. Serial No. 267,161.

The invention forming the subject matter of this application relates to pipe threading devices using inside guides.

The standard threading device or cutter used at present supports the cutter at a remote point and not opposite the point where the dies are pressed against the pipe to be threaded. The tool support is usually several inches from the cutter itself. At present it is necessary to use an outside bushing which forms part of the casting of the threading tool, thus elongating the tool. Furthermore, the bushing on the tool forming the outside guide on the pipe also spaces the dies from the vise, thus preventing the cutting of the thread on the pipe up to the vise holding the same. In case the threading device or cutter is used for cutting thread on short nipples, the aforementioned bushing obstructs the movement of the cutting tool on the portion of the nipple adjacent to the vise in which it is held.

The primary object of the invention is to provide a threading device or thread cutter in which a guide is provided for supporting the device at a point opposite the cutting tool, said guide being adapted to be disposed and moved inside of the pipe.

Another object of the invention is the provision of a pipe threading device which is guided by a support movable inside of the pipe and in which the use of an outside guide is entirely eliminated so as to permit the construction of a compact and short tool adapted to cut thread up to the portion of a pipe adjacent to the vise holding the same.

A still further object of the invention is the provision of a pipe threading device which uses the inside instead of the outside periphery of the pipe for guiding and supporting the thread cutting tool while cutting the thread.

Other objects of the invention are to provide a device of the character decribed that will be superior in point of simplicity, inexpensiveness of construction, positiveness of operation, and facility and convenience in use and general efficiency.

In this specification and the annexed drawing the invention is illustrated in the form considered to be the best, but it is to be understood that the invention is not limited to such form because it may be embodied in other form; and it is also to be understood that in and by the claims following the description, it is desired to cover the invention in whatsoever form it may be embodied.

The invention is clearly illustrated in the accompanying drawing in which,

Figure 1 is a front view of the pipe threading device as attached to a standard tool, Figure 2 is a sectional view of the device, the section being taken along the line 2—2 of Figure 1, Figure 3 is a sleeve of larger outside diameter than that in Figure 4 and used for the same purpose, Figure 4 is a sleeve to be used in conjunction with the inside guide of my device for adapting the guide to be used in connection with pipes of various inside diameter, Figure 5 is a cross-sectional view of my device used in conjunction with a ratchetless thread cutting device, the type commonly described in the trade as Armstrong pipe thread cutting device.

Referring to the accompanying drawing wherein similar reference characters designate similar parts throughout, the various figures described above adequately illustrate my invention, and the following detailed description is commensurate with the above mentioned drawing in enabling an artisan to construct and assemble the constituent parts of the same.

In carrying out my invention, I employ a stock frame 6, in which are inserted dies 7 forming a desired male thread, when rotated and threaded on a pipe 8. The frame 6 has a long handle 9 radially extending therefrom by means of which the tool is rotated. Although the handle 9 may be directly connected to a frame, in the illustration shown in Figures 1 and 2, the handle 9 is operatively connected to the stock frame 6 by means of a ratchet ring 11 into which the handle 9 extends. A spring pawl denoted by the numeral 12, not shown in detail, engages the recess 13 of the outside periphery of the frame when the handle 9 is moved in one direction. The spring pawl is usually reversible, so as to be used also when the stock is removed after the thread is cut.

When the dies 7 are inserted into the stock frame 6 they are pressed against a rear wall 14 of said stock frame by means of a die retaining ring 16 which in turn is secured to the stock frame 6 by countersunk screws 17. Four studs 18 are threadedly secured into the face of the die retaining ring 16. On the studs is supported a spider 19 which spider is readily secured in place by the tightening of nuts 21 on the studs 18. In order to obviate the necessity of the removal of the nuts 21 when the spider is to be detached from the die retaining ring, the arms of the spider are provided with slots 22, all the slots pointing in the same direction of rotation so that when the nuts 21 are loosened then the spider 19 may be readily removed by rotating the same slightly in a counter clockwise direction, looking at Figure 1, thus disengaging the slots 22 from the studs 18 and permitting the ends of the spider arms to clear the nuts 21.

An inside guide spindle 23 is secured into the hub portion 24 of the spider 19 by means of a nut 25 threadedly engaging a reduced end 26 of the guide spindle 23. The guide spindle 23 extends beyond the rear wall 14 of the stock frame 6 and is of such diameter as to slidably fit the inside of a pipe on which the thread is to be cut.

It is to be noted that there is no bushing provided on the outside of the stock frame 6 for supporting and guiding the same on the outside periphery of the pipe 8, because the thread cutting device is supported wholly by the guide spindle 23 on the inside periphery of the pipe 8. It is also to be noted that the inside guide spindle 23 also supports the thread cutting device at a point directly inside and opposite to the dies 7.

The cutting of the thread may be readily accomplished by inserting the guide spindle 23 in the pipe 8 and advancing the die until the same is in cutting relation with the end of the pipe 8; then by turning the stock frame 6, the dies 7 are rotated therewith and thus threaded on the pipe in the usual manner. The guide spindle 23 advances inside of the pipe with the advancement of the dies 7 while the latter cuts the thread. The cutting device may be also employed for cutting a running thread as it is frequently used on electric conduits. In such a case, the inside guide can be readily removed by loosening the nut 21 and removing the spider 19 and the guides 23 therewith in the manner heretofore described. It is to be observed that the spider may be readily removed without in any way changing the position of the die retaining ring 16 relative to the die 7. Thus the spindles may be readily replaced by spindles fitting the inside of extra heavy and double extra heavy pipes, which are smaller than the inside of a standard pipe, the outside diameter of all three size pipes being the same.

In the event of small size thread-cutting tools, and particularly the type shown in Figure 5, the dies may be interchangeable and in this case the same stock frame is used for several sizes of thread cutting dies. The guide spindle 23 is of such diameter as to conform to the inside diameter of the smallest pipe on which a thread may be cut by the particular tool.

When the dies 7 are exchanged in the usual manner for a larger size so as to cut threads on a larger pipe, then the increase of the diameter of the sliding guide 23 is effected by means of a sleeve 27 of such diameter as to conform to the increase of the size of the dies 7. The sleeve 27 is provided with an annular groove 28 near to the end thereof adjacent to the spider 19, the other end of the sleeve being slightly tapered so as to facilitate the insertion of the sleeve into the pipe 8. In some cases, the friction developed between the sleeve 27 and the inside periphery of the pipe 8 may tend to retain the sleeve when the tool is withdrawn from the pipe and cause the sleeve to slide off the guide spindle 23. Therefore, a set screw 29 is threadedly secured in the die retaining ring at a distance from the spider 19 and opposite to the annular groove 28. Normally, the set screw 29 is in about the position shown in Figure 2, but when the sleeve 27 is slid upon the guide spindle 23, the set screw 29 is advanced so as to engage said annular groove 28, thereby preventing the accidental displacement or removal of the sleeve 27 from the guide spindle 23. In case the dies 7 are replaced with still larger dies, then a thicker sleeve 31 is slid upon the guide spindle 23. The design of the sleeve 31 is similar to that of the sleeve 27 excepting that the inside diameter thereof is increased at the central portion of the sleeve, thus reducing the weight and the bulk of the sleeve. A sleeve is provided for each size of pipe within the range of a particular thread-cutting device.

In Figure 5 is shown the adaptation of my inside guide spindle principle to a threading device of the type having two oppositely disposed handles 9a thereon directly secured to a ratchetless stock frame 32. In this type of thread-cutting device, the dies are not secured in place by means of die retaining rings, but are directly secured to the stock casing by means of screws or bolts.

My improvement on this device involves the extending of the stock casing 32 so as to form an annular hub 33 upon which is disposed the spider 19 and guide spindle 23, heretofore described. Figure 5 shows the adaptation of the standard so-called Armstrong type of threading device so as to permit the employment of the set screw 29 for retaining the sleeve 27 upon the guide spindle 23 and also for receiving the studs 18 upon which the spider 19 is supported.

It will be recognized that a particularly facile device is provided to accomplish the above described guiding of a thread cutting device by means of a spindle inside of a pipe; and which combines light weight and ready adaptation for different sizes and types of thread cutting devices, with a ruggedness of construction and positiveness of operation especially adapting it for its use. Being a unitary character the device requires no careful setting up and lends itself to effective application by the labor ordinarily available.

Having thus described my invention, what I now claim as novel and desire to secure by Letters Patent is:

1. A pipe threading device comprising, in combination with a die, a die stock provided with a cylindrical axial extension relative to said die, a spider consisting of a central hub and a plurality of radial arms, concentric slots adjacent the ends of said arms adapted to cooperate with studs, a plurality of studs secured in said extension, a pilot secured in said hub and extending through said die, a sleeve rotatable on said pilot, and means retaining said sleeve against withdrawal on said pilot.

2. In combination with a die stock provided with a central pilot, a sleeve rotatably mounted on said pilot, an annular groove in said sleeve and a screw secured in said stock and cooperating with said annular groove.

In testimony whereof I affix my signature.

CLAUDE B. PERRY.